(12) United States Patent
Adam et al.

(10) Patent No.: US 11,822,646 B2
(45) Date of Patent: Nov. 21, 2023

(54) GENERATING AN AUTOMATED SECURITY ANALYSIS FOR AN INSTALLATION

(71) Applicants: Alexander Adam, Weiden (DE); Klaus Rother, Reichenschwand (DE); Markus Schott, Haunetal-Stärklos (DE)

(72) Inventors: Alexander Adam, Weiden (DE); Klaus Rother, Reichenschwand (DE); Markus Schott, Haunetal-Stärklos (DE)

(73) Assignee: Siemens Aktiengesellschaft, Munich (DE)

( * ) Notice: Subject to any disclaimer, the term of this patent is extended or adjusted under 35 U.S.C. 154(b) by 136 days.

(21) Appl. No.: 17/343,715

(22) Filed: Jun. 9, 2021

(65) Prior Publication Data

US 2022/0004626 A1   Jan. 6, 2022

(30) Foreign Application Priority Data

Jun. 10, 2020 (EP) ..................................... 20179185

(51) Int. Cl.
*G06F 21/00* (2013.01)
*G06F 21/54* (2013.01)

(52) U.S. Cl.
CPC ........ *G06F 21/54* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 5,892,900 | A  * | 4/1999 | Ginter | G06F 21/78 726/26 |
| 7,143,290 | B1 * | 11/2006 | Ginter | H04N 21/4627 713/193 |
| 9,106,630 | B2 * | 8/2015 | Frazier | H04L 63/08 |

(Continued)

OTHER PUBLICATIONS

Pongsrisomchal, Sutthinee; Ngamsuriy Aroj, Sudsanguan. Automated IT Audit of Windows Server Access Control. 2019 21st International Conference on Advanced Communication Technology (ICACT). https://ieeexplore.ieee.org/stamp/stamp.jsp?tp=& arnumber= 8701931 (Year: 2019).*

(Continued)

*Primary Examiner* — Jeremiah Lavery
(74) *Attorney, Agent, or Firm* — Lempia Summerfield Katz LLC

(57) ABSTRACT

A method, with the aid of which an installation-wide security consideration may be carried out, that is not limited only to automation components of a single manufacturer, but that functions across all manufacturers, is provided. Through suitable user guidance and automated support in process-conforming execution of assessments, incident handling and the definition of security measures as well as corresponding tracking, the method has a high level of user-friendliness. A rule generator uses security criteria in order to develop user-specific analysis rules from a complex rulebook with a number of input values. All the installation-relevant data is automatically compiled in an inventory. The machine security auditor applies the user-specific rulebook to the collected installation data from the asset inventory, and from that, prepares the audit trail.

17 Claims, 2 Drawing Sheets

(56) References Cited

U.S. PATENT DOCUMENTS

| | | | |
|---|---|---|---|
| 2002/0048369 A1* | 4/2002 | Ginter | G06F 21/572 |
| | | | 380/246 |
| 2003/0120935 A1* | 6/2003 | Teal | H04L 63/0823 |
| | | | 713/188 |
| 2007/0282951 A1* | 12/2007 | Selimis | H04L 69/08 |
| | | | 709/205 |
| 2014/0137257 A1 | 5/2014 | Martinez et al. | |
| 2016/0366160 A1* | 12/2016 | Kapoor | H04L 41/0866 |
| 2017/0264640 A1* | 9/2017 | Narayanaswamy | |
| | | | H04L 63/0281 |
| 2017/0353477 A1* | 12/2017 | Faigon | G06F 21/6209 |
| 2018/0146004 A1 | 5/2018 | Belfiore, Jr. et al. | |
| 2018/0205755 A1* | 7/2018 | Kavi | G06F 21/577 |
| 2019/0052602 A1* | 2/2019 | Abraham | H04L 63/1416 |
| 2020/0027096 A1* | 1/2020 | Cooner | G06Q 40/04 |
| 2020/0057851 A1* | 2/2020 | Agarwal | G06F 30/20 |
| 2020/0364525 A1* | 11/2020 | Mats | H04W 4/70 |
| 2022/0004626 A1* | 1/2022 | Adam | G06F 21/54 |

OTHER PUBLICATIONS

Torkura, Kennedy A. et al. CSBAuditor: Proactive Security Risk Analysis for Cloud Storage Broker Systems. 018 IEEE 17th International Symposium on Network Computing and Applications (NCA). https://ieeexplore.ieee.org/stamp/stamp.jsp?tp=&arnumber=8548329 (Year: 2018).*

Koschorreck, Gerhard. Automated Audit of Compliance and Security Controls. 2011 Sixth International Conference on IT Security Incident Management and IT Forensics. https://ieeexplore.ieee.org/stamp/stamp.jsp?tp=&arnumber=5931118 (Year: 2011).*

European Search Report for European Application No. 20179185.2-1218 dated Nov. 13, 2020.

IEC 62443-3-2 ED1: Security for industrial automation and control systems—Part 3-2: Security risk assessment for system design, 65/799/FDIS, IEC, 3, Rue De Varembe, PO Box 131, CH-1211 Geneva, Switzerland. Apr. 3, 2020. pp. 1-31, XP082020455.

Wikipedia "Stride (security)" https://en.wikipedia.org/wiki/STRIDE_(security) Retrieved Nov. 4, 2020. pp. 1-3.

* cited by examiner

GENERATING AN AUTOMATED SECURITY ANALYSIS FOR AN INSTALLATION

This application claims the benefit of European Patent Application No. EP 20179185.2, filed on Jun. 10, 2020, which is hereby incorporated by reference in its entirety.

BACKGROUND

The German term "Sicherheit" has more than one meaning. In technical contexts, there is a differentiation between the two aspects covered by the English words "safety" and "security".

In Germany, the term "security" has a very broad range of meanings, in particular relating to technical security measures (e.g., security technology). In standards, directives, and rulebooks, when "security" is intended, the term "security technology" is most often used if the subject matter is security against cyber-attack, such as, for example, the security or confidentiality of data (e.g., encryption technologies, authentication mechanisms). Security technology is fundamentally concerned with the detection, limitation, and defense against threats to material or virtual facilities, objects, or things. When security is discussed below, it is this type of "security", as discussed above, that is intended.

In addition to this, the term also means "safety", where it is operating safety that is fundamentally intended. The focus is on the prevention of effects on individuals (e.g., the protection of people). This involves preventive measures against the occurrence of events (e.g., incidents, accidents, and other unwanted circumstances) having an origin that lies with unintentional human and/or technical inadequacies, as well as with the limitation or control of such incidents and with general problems of occupational safety.

A definition and differentiation is found, for example, in German at https://de.wikipedia.org/wiki/Sicherheit In the automation sector, there are devices that are safety-critical in an installation. Individual safety settings are provided for many of these devices. In addition, a complex rulebook (e.g., IEC 62443, "Defense in Depth", "Operational Guidelines") is to be complied with for operation of the installation.

With the increasing prevalence of digitization in industry, the safety requirements of automation equipment are increasing even further, since the complexity of the installations is rising as a result of components that are more and more networked, automated, and intercommunicating. The risk of unwanted attempts to break in from the outside is also rising.

Based on specified criteria, software vulnerabilities may be assessed, exploitation may be minimized, known malware may be combated, and security mechanisms may be checked.

Generally speaking, a potential hazard that is triggered by a vulnerability refers to an event that causes damage, an attack on a system, a transmission path, or on the information content of the message, espionage, sabotage, or also hazards that are caused unintentionally or that result from natural events such as power failures, or are deliberately caused by employees.

Automatic support for the user or customer to ascertain the necessary measures (e.g., the ascertainment of a security level in accordance with IEC 62443) for installation, as well as the associated division into security zones, is, however, still missing.

An automatically prepared summary of the security-relevant settings, configurations, or an installation-wide listing of the known, necessary security updates and boundary conditions, is also missing.

An automatically prepared summary of the measures necessary to conform with existing rulebooks (e.g., to achieve a security level conforming with IEC 62443) would also be desirable.

Automated support for the collection, analysis, and evaluation of attack vectors may help to derive measures to protect from the attack vectors.

An analysis of the effects of changes, also known as failure mode and effects analysis (FMEA) methods, would also be helpful.

There are not at present any automated aids for the evaluation of security, the definition of measures, and tracking according to specified rulebooks and standards in the industrial environment.

Manual and automatic collection of information relating to the individual assets is only partially present.

Currently, analysis is only carried out manually, and at specific times. This analysis is to be repeated cyclically throughout the life-cycle of the installation.

The manual collection of the information is potentially error-prone, and has the potential for absence of know-how, incompleteness, and difficult reproducibility of the evaluation criteria due to the individual human execution.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a method and an apparatus that perform an automated security evaluation on an installation and thus overcome the above-mentioned disadvantages are provided.

The analysis rulebook is a meta-database that describes the security threats of different asset types relating to the entities (e.g., users/groups/roles, devices, services, applications on the devices, etc.) depending on configuration.

The description that follows here is sufficient, although not exhaustive, for carrying out the method; further information may be collected and used in all the categories.

For this purpose, the following classes are introduced for the method according to the present embodiments:

TrustZone:

| Attribute | Description | Data type |
| --- | --- | --- |
| ZoneID* | Unique identifier | Instance |
| Name | Name | Instance |
| SecurityLevel | Numerical value for the security level required for a zone | Instance |

Entities:
(users/groups/roles, devices, services, applications . . . ):

| Attribute | Description | Data type |
| --- | --- | --- |
| EntityID* | Unique identifier | Instance |
| EntityTypeID* | Identifier of the type (MetaID) | Type |

-continued

| Attribute | Description | Data type |
|---|---|---|
| SecurityCriteria | From the automatically performed classification, see below | Type |
| ZoneID | TrustZone in which the asset is located | Instance |
| Name | Name | Instance |
| Attributes <Key, Value> | List of the attributes | Type/Instance |

Communications/Relations

| Attribute | Description | Data type |
|---|---|---|
| RelationID* | Unique identifier | Instance |
| RelationTypeID* | Identifier of the type (MetaID) | Type |
| SecurityCriteria | From the automatically performed classification, see below | Type |
| SourceEntityID | Starting point of the communication/relation | Instance |
| DestinationEntityID | End point of the communication/relation | Instance |
| Name | Name | Instance |
| Attributes <Key, Value> | List of the attributes | Type/Instance |

Threat type:

| Attribute | Description | Data type |
|---|---|---|
| ThreatTypeID* | Identifier of the threat type (MetaID) | Type |
| SecurityCriteria | From the automatically performed classification, see below | Type |
| FilterExpression | | Type |
| Title | Identifier | Type |
| AttackType | S, T, R, I, D, E | Type |
| Impact | Possible effects | Type |
| Description | Description of the threat type | Type |
| PossibleMitigation | Description of a possible strategy for containment | Type |

(*= Identifier/primary key)

DETAILED DESCRIPTION

Figure 1:
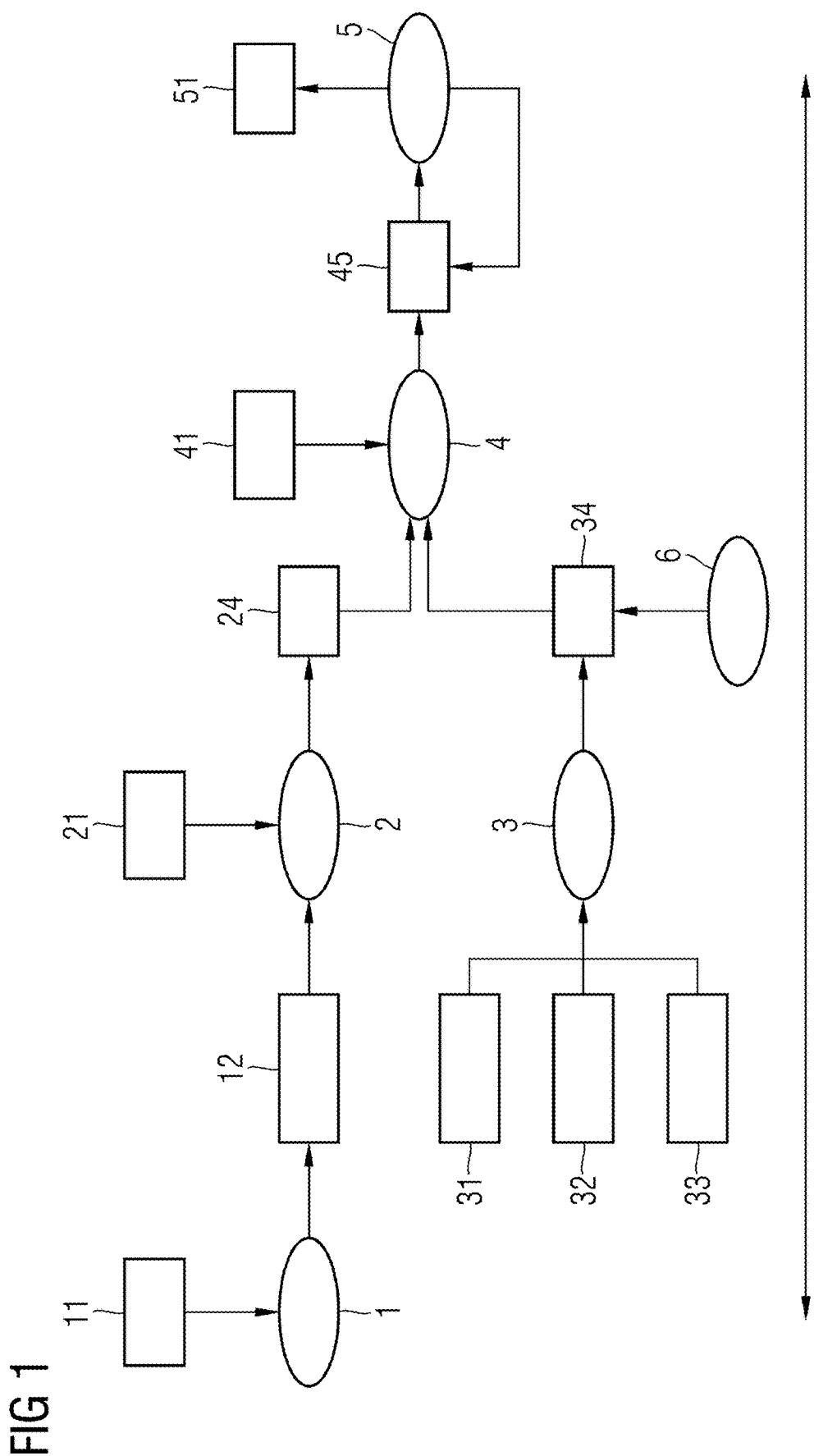
FIG. 1 is a flow diagram of one embodiment of a method.

Devices G1, G2, G3 are organizationally and hierarchically divided into different security zones, external EN and internal IN (DMZ), IN1, IN2, possibly having different security requirements. Information relating to the asset inventory relates to a structure of this sort illustrated by way of example here.

The desired procedure will now be illustrated below with reference to the flow diagram of FIG. 1, based on an installation architecture such as is illustrated schematically in FIG. 2, in 5 acts.

In act 1, security classification is automatically performed, and security requirements are ascertained.

When no database is yet present for further evaluation, this may be ascertained in advance, for example, by a query catalog 11 relating to the security and protection needs and on possible requirements for conforming with known security standards (e.g., IEC 62443). A user may, for example, be asked to enter them.

The data and information ascertained in this way is collected as data objects and named. Following this, the need for protection of this data and information is ascertained, providing that the effects of a loss of or attack on it are evaluated, 1.

Input: A query catalog for ascertainment of the required protection based on the different standards (e.g., known, partially listed above) or guidelines specified by the user, 11.

Output: A list of user-specific security criteria for filtering the required rules out of the totality of the analysis rulebook, 12 (e.g., the requirements for security level 2 of IEC 62443), and of the protection requirements for the individual assets emerging therefrom (e.g., the need for encrypted communication).

The security criteria are assigned to the threat types/threats in the "Complete Analysis Rulebook".

A maximum protection level of the installation under consideration may also be ascertained.

In act 2, a rule generator 2 filters the required rules out of the complete rulebook, 21. Optionally, the rules generated in this way may also be modified by the user according to need.

Input: need for security criterion, 12; complete rulebook (e.g., IEC 62443, IEC 27001, internal policies, described by meta-knowledge, . . . ) 21; input from various sources, such as, for example, firmware (FW) version requirements, security vulnerability information SVI, patch level of the assets used, common vulnerability scoring system (CVSS), general vulnerability evaluation system, an industry standard for evaluation of the level of severity of possible or actual security loopholes in computer systems; analysis and identification of the threats; preparation of a threat catalog and corresponding rules; threat analysis according to the "STRIDE" model. This is a model that was developed in order to identify threats to computer security. The model offers a short designation for security threats in six categories. The letters stand here for: Spoofing (Methods of deception in computer networks to conceal one's own identity); Tampering (Sabotage through the introduction of a manipulated product); Repudiation (Changing the authorship for actions carried out by a malicious user in order to manipulate log files and conceal activities. See also Spoofing); Information disclosure (Data protection/privacy breach or data leak); Denial of service (Denial of service refers to the non-availability of the service, for example, through the deliberate generation of an overload); Elevation of privilege (Elevation of privilege refers to the exploitation of a fault in the construction or configuration of an item of software, with the aim of providing a user or an application with access to resources, the use of which is not possible with restricted rights.)

Output: A modified rulebook for the automated analysis of the installation, 24, is generated.

In act 2, the relevant threat scenarios and assets are filtered out using the security criteria from the "Complete Analysis Rulebook".

In act 3, automated collection/aggregation of the installation information is provided. The collection of the information related to the individual assets is carried out automatically; if necessary the collection may be supplemented by manual collection and entry. The information regarding the zone/region in which the device is currently installed or stored is, for example, to be assigned or supplemented manually. In this way, and based on this information, a digital twin that is enhanced by information regarding the security of the installation is created.

Input: Available information about the installation, although a full list is not shown in the figure. Further information groups that may also be referred to include: Engineering data (e.g., from the TIA configuration system from Siemens or comparable applications); security information and event management (SIEM); Logging, monitoring, diagnosis and audit data network analysis; Structure of the installation (e.g., installation topology scan, devices/component discovery), 33; Configuration, 31; Possible interactions (e.g., through communication); Identity and access management (IAM); Integrity monitoring; Software, firmware, and patch level management; Anomaly detection (e.g., including by the intrusion detection system known as IDS); Installation geography, 32, describing in which security zone the device is located, and which networks are used for communication.

Output: An asset inventory 34 (e.g., a directory of all known installation information relating to the entities, corresponding interrelationships, and properties).

In act 4, security auditor (e.g., automated analysis) is executed. The generated analysis rules are applied to the collected installation information (e.g., asset inventory, 34), and are provided to the user in the form of a list known as an audit trail. The scope of validity (e.g., location, installation part, security zone), the device or component type (e.g., PLC, switch), functional scope/field (e.g., user authentication, authorization, certificate management, OPC-UA, logging) may be set by the user.

Input: Installation information (e.g., asset inventory, 34) from act 3; Generated analysis rules 24 from act 2; The scope of validity of the analysis 41

Output: What is known as an audit trail is generated, this being a list of event datasets (e.g., findings or deviations) that are subsequently evaluated and defined for the appropriate measures.

An audit trail refers in general to a quality assurance tool. The audit trail is used to monitor and record changes that are made in processes. In comparison to other monitoring systems that thoroughly monitor specific processes, the focus of audit trails is on monitoring the change and deletion activities of users. Interventions in processes are thus comprehensible, may be monitored, and are fully visible to downstream levels in supply and value creation chains.

In act 4, the security auditor applies the rulebook 24 created in act 2 to the collected installation information (e.g., the asset inventory 34), taking the scope of validity 41 into account.

An object model is then constructed from the asset inventory, having the properties described in the metamodel filtered from the rule generator in act 2.

For each asset found (e.g., entities and relations, devices and relationships), each threat in the list from act 2 is checked with reference to a filter expression. If this threat relates to the found asset, this is entered as an event (e.g., hit/finding/deviation) in the list (e.g., audit trail).

In act 5, evaluation, definition of measures, and tracking are provided. An evaluation of the generated audit trail is made with reference to a prepared checklist.

Further measures 51 are defined based on the evaluation of the audit trail (e.g., based on a catalog with possible measures/proposals).

The audit trails are also used for later tracking of the implementation and effectiveness of the measures found.

Input: Audit trail 45

Output: A modified audit trail 45 and defined measures 51 (e.g., with optional linking to an existing defect management tool in order to be able to track an implementation of the measures).

Figure 2:
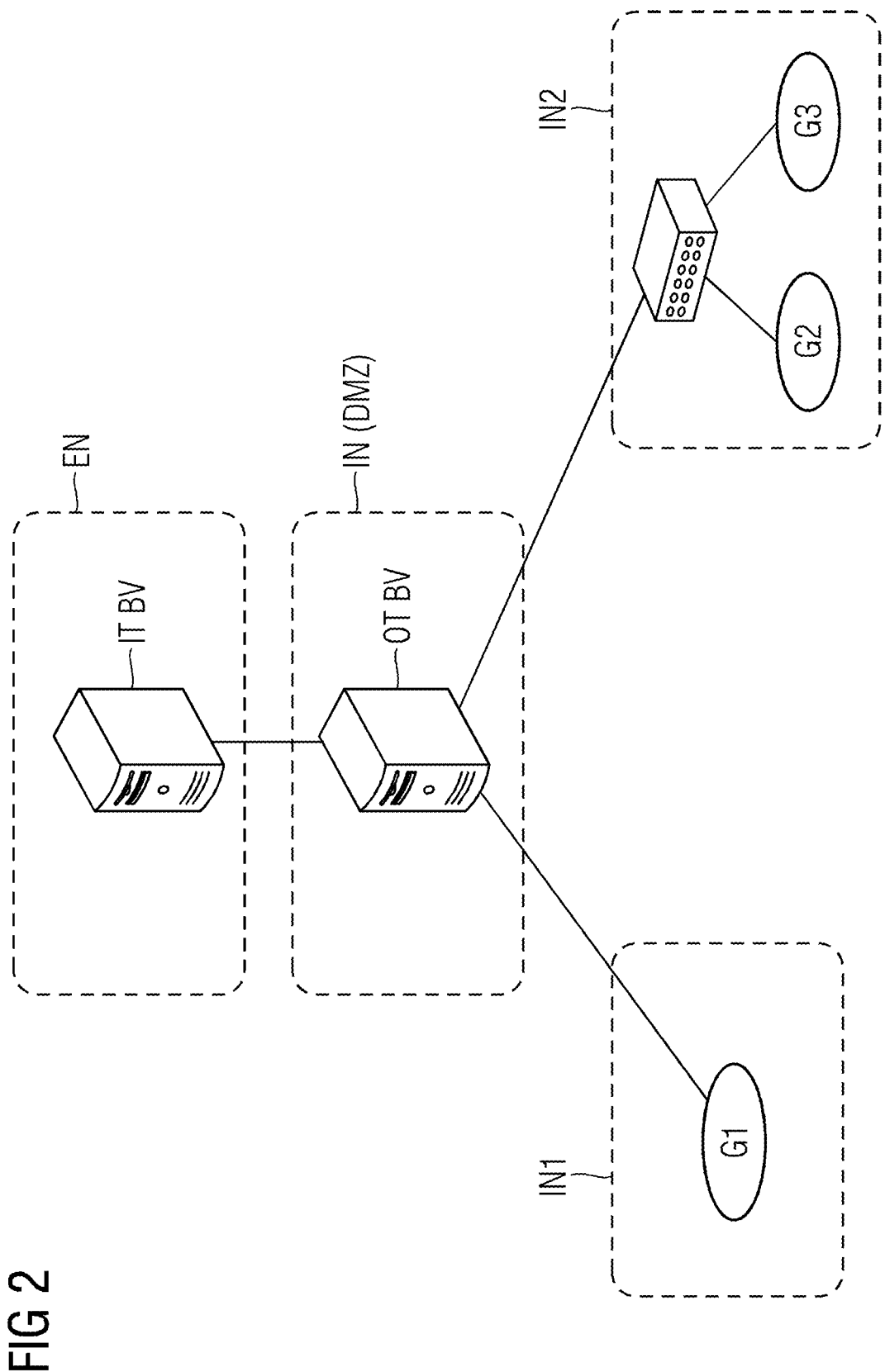
FIG. 2 is a highly simplified schematic illustration of an affected installation.

FIG. 1 shows the flow of the process for guiding the user through automated support in the classification, acquisition of the assets, analysis, evaluation, definition of measures, and tracking.

The following advantages emerge from the described method: The evaluation of the installation is simplified according to defined rulebooks (such as IEC 62443, already cited in the introduction).

The defined process flow may be applied in real time and based on current data throughout the complete life-cycle of the installation/product.

A further advantage of the described object is the reduction in the operating expenses (e.g., OPEX costs, operational expenditure) throughout the complete life-cycle of an installation that arise through the necessary, recurring security audits (e.g., of critical infrastructures). This also includes the automated acquisition of security-relevant assets.

The audit may be focused, for example, on specific themes or regions, by user guidance through a query catalog. The user is guided through the classification of installation and does not, as in the past, have to read all the relevant standards, evaluate the relevant standards, and adapt the relevant standards to concrete application.

A further advantage of the procedure of the present embodiments is that an installation-wide security consideration may be carried out that is not limited only to automation components of a single manufacturer, but that functions across all manufacturers.

Through suitable user guidance and automated support in process-conforming execution of assessments, incident handling and the definition of security measures as well as their tracking, the method also has a high level of user-friendliness.

Throughout the life-cycle, the analysis of the present embodiments may be initiated by the automation system (e.g., event-driven or time-driven, external or internal requests, incident/patch management, etc.).

A user may easily use a system that operates according to the method of the present embodiments. The user is guided by a query catalog that is understandable to the user (e.g., using technical terms, depending on the security know-how of the user). The security criteria that are sought are ascertained from the responses, and in combination with the meta-knowledge.

In summary, the method proceeds as follows: The rule generator uses the security criteria to develop user-specific analysis rules from a complex rulebook with many input values.

All the data relevant to the installation (e.g., which devices, with which firmware/software status, and which security settings) are compiled in an inventory, automatically as far as possible.

The machine security auditor applies the user-specific rulebook to the collected installation data from the asset inventory, and prepares the audit trail from that.

The results of this audit are automatically stored together with possible measures, and thus do not have to be worked out or discovered independently by the user; the results may, however, be specifically adapted by the user.

This machine-supported application chain also helps to automatically track the measures for the discovered loopholes.

The automated collection and analysis may be made available as a service, so that changes to the installation may thus also be tracked.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method of generating an automated security analysis for an installation, the method comprising:
   collecting installation information;
   generating analysis rules;
   applying the analysis rules to the installation information, wherein a scope of validity of an application is specified; and
   outputting a result in the form of an audit trail, the audit trail being a list of hits, wherein the list of hits comprises an evaluation based on the analysis rules applied to the installation information,
   wherein the generated analysis rules are filtered out of a totality of an analysis rulebook based on user-specific safety criteria, and of protection requirements resulting therefrom.

2. The method of claim 1, wherein the result for the hits included in the audit trail indicates a recommended action depending on a result of the evaluation, and
   wherein the recommended action comprises security-relevant settings, security-relevant configurations, a list of security updates and boundary conditions, or any combination thereof.

3. The method of claim 1, further comprising:
   automatically tracking execution of measures for the recommended action; and
   generating new recommended actions depending on a result of the tracking.

4. The method of claim 1, further comprising:
   collecting data and information relating to the installation as data objects for generation of the installation information; and
   ascertaining a protection requirement for the collected data and information, the protecting requirement containing a statement as to effects of a security threat arising from data loss or attack.

5. The method of claim 1, wherein the installation information includes engineering data, configuration data, data relating to communication within the installation, security data, integrity data, version data of underlying software, anomaly recognition data, topology data, geography data, data on the installation structure, data relating to security zones, or any combination thereof.

6. The method of claim 1, wherein the installation information includes security data, the security data including identity and access management data.

7. The method of claim 1, further comprising:
   constructing an object model having properties that are described by a metamodel filtered by a rule generator; and
   for each found asset:
      checking each security threat in the list of hits with reference to a filter expression; and
      when the respective security threat affects the respective found asset, entering the respective security threat as the result in the audit trail.

8. The method of claim 1, further comprising ascertaining the user-specific security criteria, the ascertaining comprising:
   analyzing and identifying a threat;
   preparing a threat catalog and corresponding rules; and
   conducting a threat analysis according to a "STRIDE" model.

9. In a non-transitory computer-readable storage medium that stores instructions executable by one or more processors to generate an automated security analysis for an installation, the instructions comprising:
   collecting installation information;
   generating analysis rules;
   applying the analysis rules to the installation information, wherein a scope of validity of an application is specified; and
   outputting a result in the form of an audit trail, the audit trail being a list of hits, wherein the list of hits comprises an evaluation based on the analysis rules applied to the installation information,
   wherein the generated analysis rules are filtered out of a totality of an analysis rulebook based on user-specific safety criteria, and of protection requirements resulting therefrom.

10. The non-transitory computer-readable storage medium of claim 9, wherein the result for the hits included in the audit trail indicates a recommended action depending on a result of the evaluation, and
    wherein the recommended action comprises security-relevant settings, security-relevant configurations, a list of security updates and boundary conditions, or any combination thereof.

11. The non-transitory computer-readable storage medium of claim 9, wherein the instructions further comprise:
    automatically tracking execution of measures for the recommended action; and
    generating new recommended actions depending on a result of the tracking.

12. The non-transitory computer-readable storage medium of claim 9, wherein the instructions further comprise:
    collecting data and information relating to the installation as data objects for generation of the installation information; and
    ascertaining a protection requirement for the collected data and information, the protecting requirement containing a statement as to effects of a security threat arising from data loss or attack.

13. The non-transitory computer-readable storage medium of claim 9, wherein the installation information includes engineering data, configuration data, data relating to communication within the installation, security data, integrity data, version data of underlying software, anomaly recognition data, topology data, geography data, data on the installation structure, data relating to security zones, or any combination thereof.

14. The non-transitory computer-readable storage medium of claim 9, wherein the installation information includes security data, the security data including identity and access management data.

15. The non-transitory computer-readable storage medium of claim 9, wherein the instructions further comprise:

constructing an object model having properties that are described by a metamodel filtered by a rule generator; and for each found asset:

checking each security threat in the list of hits with reference to a filter expression; and when the respective security threat affects the respective found asset, entering the respective security threat as the result in the audit trail.

16. The non-transitory computer-readable storage medium of claim 9, wherein the instructions further comprise ascertaining the user-specific security criteria, the ascertaining comprising:

analyzing and identifying a threat;

preparing a threat catalog and corresponding rules; and conducting a threat analysis according to a "STRIDE" model.

17. An apparatus for generating an automated security analysis for an installation, the apparatus comprising:

a collecting unit configured to collect installation information;

a generating unit configured to generate analysis rules;

an analysis unit configured to apply the analysis rules to the installation information, taking a scope of validity of the application into consideration; and an output unit configured to output a result of the application of the analysis rules to the installation information in the form of an audit trail as a list of hits, wherein the list of hits comprises an evaluation based on the analysis rules applied to the installation information, wherein the generated analysis rules are filtered out of a totality of an analysis rulebook based on user-specific safety criteria, and of protection requirements resulting therefrom.

* * * * *